United States Patent
Kangastupa (10) Patent No.: US 11,351,633 B2
(45) Date of Patent: Jun. 7, 2022

(54) LASER PROCESSING APPARATUS AND METHOD

(71) Applicant: Corelase Oy, Tampere (FI)

(72) Inventor: Jarno Kangastupa, Tampere (FI)

(73) Assignee: CORELASE OY, Tampere (FI)

( * ) Notice: Subject to any disclaimer, the term of this patent is extended or adjusted under 35 U.S.C. 154(b) by 0 days.

(21) Appl. No.: 15/518,510

(22) PCT Filed: Jul. 15, 2016

(86) PCT No.: PCT/FI2016/050519
§ 371 (c)(1),
(2) Date: Apr. 12, 2017

(87) PCT Pub. No.: WO2018/011456
PCT Pub. Date: Jan. 18, 2018

(65) Prior Publication Data
US 2019/0118299 A1     Apr. 25, 2019

(51) Int. Cl.
*B23K 26/322* (2014.01)
*B23K 26/06* (2014.01)
(Continued)

(52) U.S. Cl.
CPC ........ *B23K 26/322* (2013.01); *B23K 26/0613* (2013.01); *B23K 26/0734* (2013.01);
(Continued)

(58) Field of Classification Search
CPC ........ B23K 26/32; B23K 26/06; B23K 26/24; B23K 26/07; B23K 26/244; B23K 26/26; B23K 26/322; G02B 6/26; G02B 6/02
(Continued)

(56) References Cited

U.S. PATENT DOCUMENTS 4,642,446 A * 2/1987 Pennington .......... B23K 35/004
                                           219/121.64
5,694,408 A * 12/1997 Bott ...................... H01S 3/2383
                                                372/108
(Continued)

FOREIGN PATENT DOCUMENTS

CN        101647162 A     2/2010
CN        102169217 A     8/2011
(Continued)

OTHER PUBLICATIONS

Decision to grant received for European Patent Application No. 16852879.2 dated Dec. 19, 2019, 2 pages.
(Continued)

*Primary Examiner* — Justin C Dodson
(74) *Attorney, Agent, or Firm* — Morrison & Foerster LLP (57) ABSTRACT

The invention concerns an apparatus and a method for laser processing. There is provided at least one first laser beam from at least one first optical feed fiber connected to at least one first laser device and at least one second laser beam from at least one second optical feed fiber connected to at least one second laser device. Said first and second laser beams are combined in a multi-core optical fiber. Said first core of said multi-core optical fiber has a circular cross-section, and said second core has an annular shape concentric to said first core. A composite laser beam comprising first and second output beams is directed from said multi-core optical fiber to a workpiece with overlapping elements to be welded.

6 Claims, 6 Drawing Sheets

(51) Int. Cl.
  *B23K 26/073*   (2006.01)
  *B23K 26/244*   (2014.01)
  *G02B 6/02*     (2006.01)
  *G02B 6/26*     (2006.01)

(52) U.S. Cl.
  CPC ........ *B23K 26/244* (2015.10); *G02B 6/02042* (2013.01); *G02B 6/262* (2013.01)

(58) Field of Classification Search
  USPC .......................................... 219/121.6–121.86
  See application file for complete search history.

(56) References Cited

U.S. PATENT DOCUMENTS

| | | | |
|---|---|---|---|
| 8,781,269 B2 | 7/2014 | Huber et al. | |
| 9,620,925 B2 | 4/2017 | Keen et al. | |
| 2002/0088784 A1 | 7/2002 | Bertez | |
| 2004/0200813 A1 | 10/2004 | Alips et al. | |
| 2006/0219673 A1* | 10/2006 | Varnham | B23K 26/0734 219/121.6 |
| 2009/0266801 A1* | 10/2009 | Oku | B23K 26/32 219/121.64 |
| 2010/0163537 A1* | 7/2010 | Furuta | B23K 26/066 219/121.72 |
| 2011/0042361 A1* | 2/2011 | Nowak | B23P 6/007 219/121.64 |
| 2011/0095002 A1* | 4/2011 | Katayama | B23K 26/244 219/121.61 |
| 2012/0074110 A1* | 3/2012 | Zediker | B08B 7/0042 219/121.72 |
| 2013/0223792 A1* | 8/2013 | Huber | B23K 26/064 385/18 |
| 2013/0294728 A1* | 11/2013 | Rockwell | G02B 6/4296 385/39 |

FOREIGN PATENT DOCUMENTS

| | | | | |
|---|---|---|---|---|
| CN | 102289078 | A | 12/2011 | |
| CN | 103056523 | A | 4/2013 | |
| CN | 204790085 | U | 11/2015 | |
| EP | 2071376 | A1 | 6/2009 | |
| FR | 2790689 | A1 | 9/2000 | |
| JP | 2001108869 | A | 4/2001 | |
| JP | 2001138084 | A | 5/2001 | |
| JP | 2002160083 | A | 6/2002 | |
| JP | 2002224876 | A | 8/2002 | |
| JP | 2004154813 | A | 6/2004 | |
| JP | 2007007766 | A | 1/2007 | |
| JP | 2007518566 | A | 7/2007 | |
| JP | 2009145888 | A | 7/2009 | |
| JP | 2011227269 | A | 11/2011 | |
| JP | 2013180295 | A * | 9/2013 | ........... B23K 26/073 |
| JP | 201418800 | A | 2/2014 | |
| JP | 2017532607 | A | 11/2017 | |
| KR | 10-2013-0037679 | A | 4/2013 | |
| WO | WO2007007766 | A1 | 1/2009 | |
| WO | WO-2009003484 | A2 * | 1/2009 | ........... G02B 6/2835 |
| WO | WO 2016062914 | A1 | 4/2016 | |
| WO | WO2016198724 | A2 | 12/2016 | |

OTHER PUBLICATIONS

European Search Report received for European Patent Application No. 16852879.2 dated Jun. 13, 2018, 4 pages.
Intention to grant received for European Patent Application No. 16852879.2 dated Oct. 29, 2019, 6 pages.
International Preliminary Report on Patentability received for PCT Patent Application No. PCT/FI2016/050519, dated Jan. 24, 2019, 11 pages.
International Search Report and written Opinion received for PCT Patent Application No. PCT/FI2016/050519, dated Nov. 14, 2016, 14 pages.
Notice to File a Response received for Korean Patent Application No. 10-2017-7011848, dated May 20, 2019, 8 pages (English Translation Only).
Office Action received for Brazilian Patent Application No. 112019000361-4, dated May 28, 2020, 4 pages (Official Copy Only) (See Communication under 37 CFR § 1.98(a) (3)).
Office Action received for Canadian Patent Application No. 3,026,330, dated Oct. 17, 2019, 3 pages (English Translation Only).
Office Action received for Chinese Patent Application No. 201680003642.4, dated Dec. 25, 2018, 8 pages (English Translation Only).
Office Action received for European Patent Application No. 16852879.2 dated Jul. 5, 2018, 5 pages.
Office Action received for European Patent Application No. 16852879.2 dated Mar. 6, 2019, 5 pages.
Office Action received for Japanese Patent Application No. 2017-525528, dated Aug. 21, 2018, 3 pages (1 page of English Translation and 2 pages of Official Copy).
Office Action received for Japanese Patent Application No. 2017-525528, dated Mar. 15, 2019, 2 pages (English Translation Only).
Office Action received for Korean Patent Application No. 10-2017-7011848, dated May 20, 2019, 7 pages (English Translation Only).
Office Action received for Korean Patent Application No. 10-2017-7011848, dated Nov. 27, 2019, 2 pages (English Translation Only).
Search Report received for Taiwan Patent Application No. 106122430, dated Apr. 9, 2020, 2 pages (1 page of English Translation and 1 page of Official Copy).

* cited by examiner

LASER PROCESSING APPARATUS AND METHOD

FIELD OF THE INVENTION

The invention relates to a laser processing apparatus and method. In particular, the invention concerns welding of materials by laser processing.

BACKGROUND OF THE INVENTION

When welding metal with a laser beam, the laser beam is typically condensed through a condenser lens into a spot of 100-500 μm to increase energy density and instantaneously heat the workpiece to a metal melting point of 1500 degrees or over so that the workpiece melts. At the same time, an assist gas may be fed to prevent oxidation of the molten metal. A laser beam of a one-micrometer waveband from a solid-state laser or fiber laser realizes a very high optical energy intensity and absorbance on a metallic work compared with a laser beam in the ten-micrometer waveband from of a $CO_2$ laser. However, if a one-micrometer waveband laser beam with a Gaussian beam is used with an oxygen assist gas to cut a mild steel sheet workpiece, the melt width on the top face of the workpiece widens unnecessarily and impairs kerf control. In addition self-burning may occur to deteriorate the quality of the laser cutting.

Use of ring-shaped laser beams, which provide an intensity profile that can be described as having an annular or "doughnut"-like shape is known for laser processing. It has been observed that cutting of a metal of a given thickness can be performed at much lower power when using a doughnut beam instead of more conventional beam profiles, and may yield good results in terms of cutting speed and quality.

U.S. Pat. No. 8,781,269 discloses various arrangements to direct laser beams to a multi-clad fiber to generate different beam profile characteristics of an output laser beam, where an input laser beam is electively coupled into an inner fiber core or into an outer ring core.

Such materials processing applications strive to maximize the brightness of the laser beam. Brightness is defined as the power per unit solid angle and unit area. As an example of the importance of brightness, increasing the brightness of a laser beam means that the laser beam can be used to increase the processing speed or the material thickness. High brightness laser beams can be obtained from e.g. fiber lasers and thin disc lasers. Direct diode lasers have constantly also improved in brightness, but commercial direct diode lasers for materials processing do not quite yet reach the brightness of fiber or thin-disc lasers.

Figure 1A:
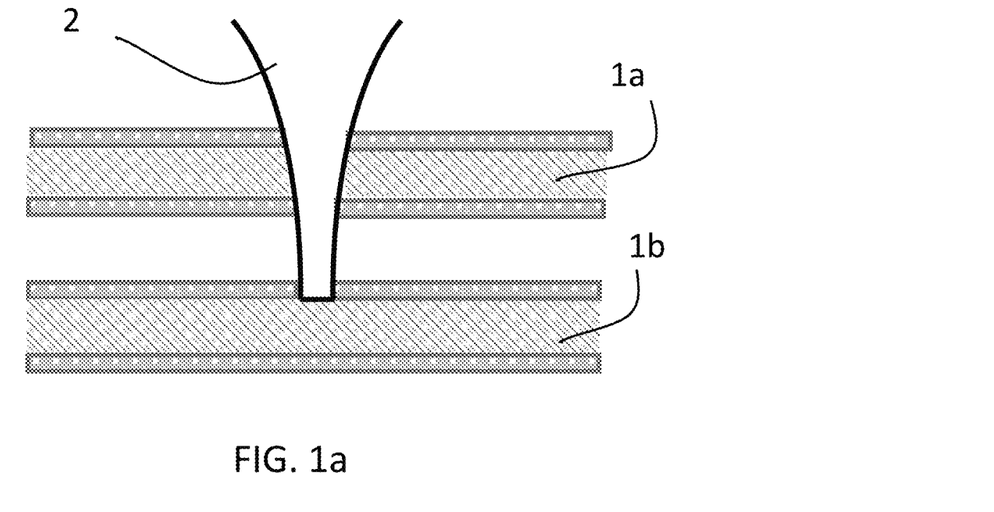
FIGS. 1a and 1b illustrate conventional laser welding of overlapping plates.
Figure 1B:
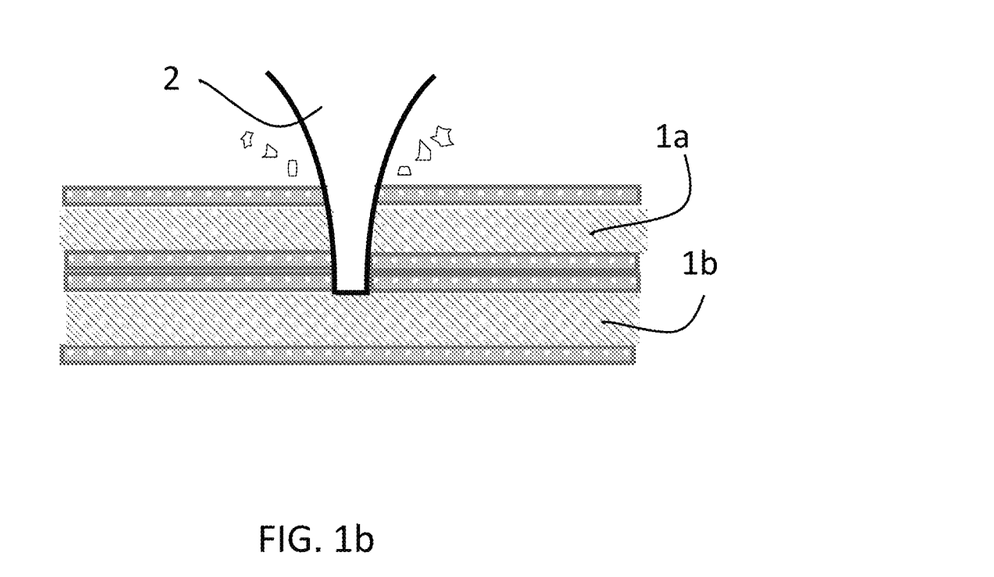

Laser processing performed according to prior art have some important drawbacks in welding overlapping coated plates illustrated in FIGS. 1a and 1b. With reference to FIG. 1a, if there is no gap between the plates 1a, 1b, the laser beam 2 causes the coating material between the plates to vaporize and the pressure causes the plates apart from each other. If there is too much gap between the plates 1a, 1b, the top plate 1a may burn through. As illustrated in FIG. 1b, if the plates are forced to be together, for example by a jig, vaporizing coating material blows out through the welding seam and cause impurity on the top plate, and an expensive and time-requiring purifying process may be required.

Accordingly, there is a need for improved methods and devices for improving laser welding of overlapping plates.

SUMMARY OF THE INVENTION

The specific solution and its embodiments are defined in the appending claims.

According to one aspect of the invention a laser processing apparatus comprises:
  at least one first laser device, each providing at least one first optical feed fiber with a first laser beam
  at least one second laser device, each providing at least one second optical feed fiber with a second laser beam;
  beam combining means connected to said first and second feed fibers and to a multi-core optical fiber, the combining means being adapted to form a composite laser beam by having said at last one optical feed fiber aligned with a first core of said multi-core optical fiber, and said at least one second optical feed fiber aligned with at least one second core of said multi-core optical fiber, wherein said first core of said multi-core optical fiber has a circular cross-section, and said second core has an annular shape concentric to said first core; and
  said first and second cores being adapted to at a laser processing head, to direct a composite laser beam comprising first and second output laser beams to a workpiece with overlapping elements to be welded.

According to another aspect of the invention, a method for processing a workpiece with a laser beam is provided, the method comprising:
  providing at least one first laser beam from at least one first optical feed fiber connected to at least one first laser device;
  providing at least one second laser beam from at least one second optical feed fiber connected to at least one second laser device;
  combining said first and second laser beams in of a multi-core optical fiber by aligning said at least one first optical feed fiber with a first core of said multi-core optical fiber and said at least one second optical feed fiber with a second core of said multi-core optical fiber; wherein said first core of said multi-core optical fiber has a circular cross-section, and said second core has an annular shape concentric to said first core, and
  directing a composite laser beam comprising first and second output beams from said multi-core optical fiber to a workpiece with overlapping elements to be welded.

According to some embodiments of the method and apparatus, the workpiece comprises a first plate and a second plate, the composite laser beam is directed to the first plate, whereby the first output laser beam from said first core causes an opening through the first plate to the second plate and the second output laser beam from said second core substantially causes welding of the plates. According to some further embodiments, the plates are coated plates, such as steel plates, and the first output laser beam causes an opening for releasing pressure caused by vaporizing coating of the second plate.

According to some embodiments of the invention, power density in said first and second output beams is controllable individually by means of a control unit which is functionally connected to said first and/or second laser devices.

According to some embodiments of the invention, the center of a first optical feed fiber adapted to guide a first laser beam is aligned with the center of said first core of said multi-core optical fiber and the center of at least one second optical feed fiber adapted to guide a second laser beam is aligned between the inner and outer diameters of said second annular core of said multi-core optical fiber.

According to some embodiments of the invention, said first output beam or set said first output beam to a low level in case of continuous welding.

According to a further aspect of the invention, an inventive apparatus is used for laser welding of overlapping elements.

Next, embodiments of the invention are described in more detail with reference to the attached drawings.

BRIEF DESCRIPTION OF THE DRAWINGS

In the following, the invention is described in detail with reference to the attached drawings, wherein.

DETAILED DESCRIPTION OF EMBODIMENTS

In various applications elements on top of each other, and with no or very little gap between the elements, need to be welded together by applying laser beam through one of the elements to form the welding between the elements. According to an aspect of the present invention, laser welding of elements on top of each other may now be improved by a method and apparatus wherein a first laser output beam having a substantially a circular cross-section and a second laser output beam with a substantially annular shape concentric to said first laser beam are formed. The first output laser beam may thus be referred to as circular or center beam, and the second output laser beam as annular or ring beam. The first output laser beam and the second laser output beam are directed to a workpiece with overlapping elements to be welded. The first output laser beam causes an opening for releasing pressure caused between the elements and the second output laser beam mainly causes welding and smoothens the opening. Thus, when the output laser beams are directed to a first plate, such as coated stainless steel plate, the first output laser beam causes a circular opening through the first plate to a second plate and the second output laser beam causes welding of the plates.

Figure 2:
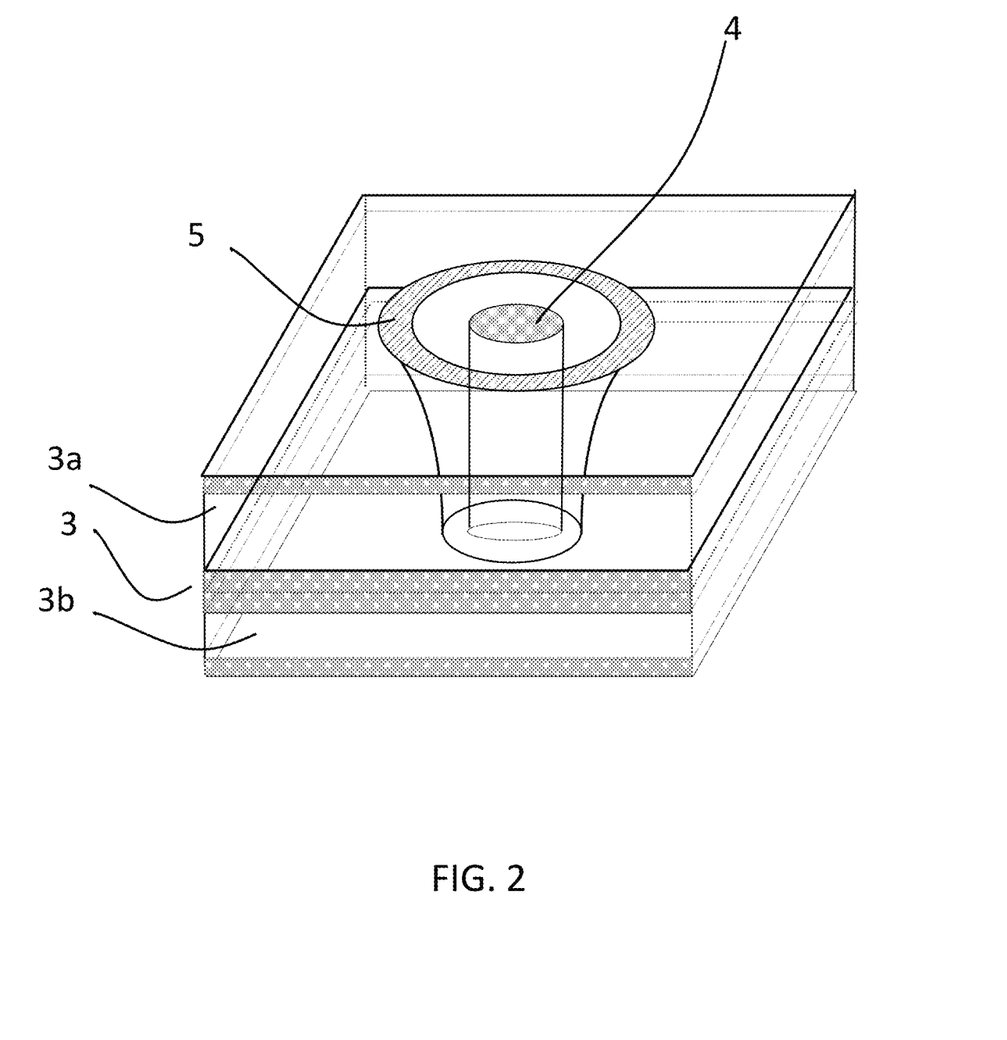
FIG. 2 shows an embodiment of applying laser welding according to an embodiment of the present invention.

FIG. 2 shows a schematic cross-section illustrating laser welding according to an embodiment of the invention. The workpiece 3 comprises a first coated plate 3a and a second coated plate 3b, such as aluminum-coated or zinc-coated steel plates. The center beam 4 causes an opening for letting pressure by the vaporizing coating of the second plate 3b to escape and the ring beam 5 substantially causes the welding of the plates and smoothening of the opening. The heat caused by the beam conducts via the first plate and melts the area inside the ring beam for forming the weld.

There are various advantages achievable by applying the presently disclosed combination of center beam 4 and ring beam 5 to weld overlapping elements. The pressure caused between the plates 3a, 3b (typically caused by the coating material) may be released by the opening caused by the center beam, which is closed when the laser moves to subsequent welding position. Upper layer coating material may blend to the weld seam without causing spatter outside the seam. Further means to force the plates together and additional purifying process to remove spatter may thus be avoided.

According to an embodiment, the power densities in said first and/or second output laser beams may be individually controlled, regardless of the state of the other beam. The embodiments may be applied for spot welding and continuous welding applications. In case of continuous welding, the leading edge of the ring beam 5 in the direction of movement of a laser processing head causes a first intensity peak and the rear edge of the ring beam 5 causes a second intensity peak. Hence, the elements are heated in stages and the intensity level of the rear and leading edge may be lower as compared to single spot beam to cause adequate melting. In addition to pre-heating, the leading edge also provides contaminant ablation. This enables to avoid sharp temperature change and avoid or at least reduce subsequent tempering and thus weaker areas caused by the sharp temperature change. The use of the ring beam in continuous welding is also advantageous in avoiding spatter. In an embodiment, power density of the center beam 4 may be set as low or the center beam may be closed completely. Thus overheating may be avoided.

A hybrid of center beam 4 and ring beam 5 may be generated by combining laser beams from originating laser devices and feed fibers in a multi-core optical fiber, from which a resulting composite laser beam with the center beam 4 and ring beam 5 may be directed to the workpiece 3. A first optical feed fiber may be aligned with a first core of the multi-core optical fiber and a second optical feed fiber may be aligned with a second core of said multi-core optical fiber. The first core of said multi-core optical fiber has a circular cross-section and the second core has an annular shape concentric to said first core. Further example embodiments are illustrated below.

In some embodiments, keyhole laser welding is applied in combination with heat conduction welding to weld elements on top of each other by applying center and ring laser beams. Laser keyhole welding is generally used when material needs to be joined with a higher thickness to width aspect ratio. A laser beam with a high intensity heats the material above evaporation temperature resulting in a deep capillary called a keyhole at the leading edge of the molten metal. As the heat source progresses, the molten metal fills in behind the hole to form a weld bead. Inert gas shields the process and protects it during the keyhole welding process from unwanted oxidization. By emitting single pulses with very high pulse intensity, spot welds can also be achieved such as is used in the electronics industry.

Heat conduction welding is applicable for sheet metal typically up to a material thickness of approximately 2 mm. A laser beam, focused on the seam, heats the material and that heat is quickly conducted through the sheets causing it to melt and join together. The focusing optic is moved along the seam while it focuses the laser beam to the sample, leaving a high quality weld. For conduction welding, lasers with lower brightness, like direct diode lasers, can be used.

A metal sheet which is processed by a diode laser capable of conduction welding or cutting, impacts a relatively shallow but wide spot of the metal. Typically diode lasers of this kind have a power rating of 2 kW and a power density of well under 0.1 $MW/cm^2$. The maximum depth (and cutting capability) of the spot is typically 2 mm. A typical keyhole pattern caused by a high brightness laser, such as a fiber laser. There is no practical limit to how thick metal sheets can be cut with such a laser, but it depends of course on the laser beam intensity and the processing speed, i.e. the speed with which the laser beam is moved across the metal surface. Fiber lasers may have a power rating of up to 1-10 kW or more, and a power intensity of several MW/cm$^2$. The diameter of the keyhole may be in the region of less than a millimeter, 0.1 millimeter for example, and the diameter of the spot 2 may be in the region of several millimeters, such as 3 millimeters, for example.

When comparing pure keyhole weld seams and application of hybrid weld seams by circular and annular laser beams it has been noted that the hybrid weld seam penetration is at least 20% deeper than that of pure keyhole weld seam using the same processing speed. Due to the very nature of the inventive hybrid welding, the weld seam is of course also wider. The Vickers Hardness (HV) values are also lower for the hybrid weld seams than for the keyhole seams, indicating a lesser hardening effect in the hybrid seams. Already from these examples, it can be seen that the effects of combining keyhole and conduction laser processing is considerable.

Figure 3:
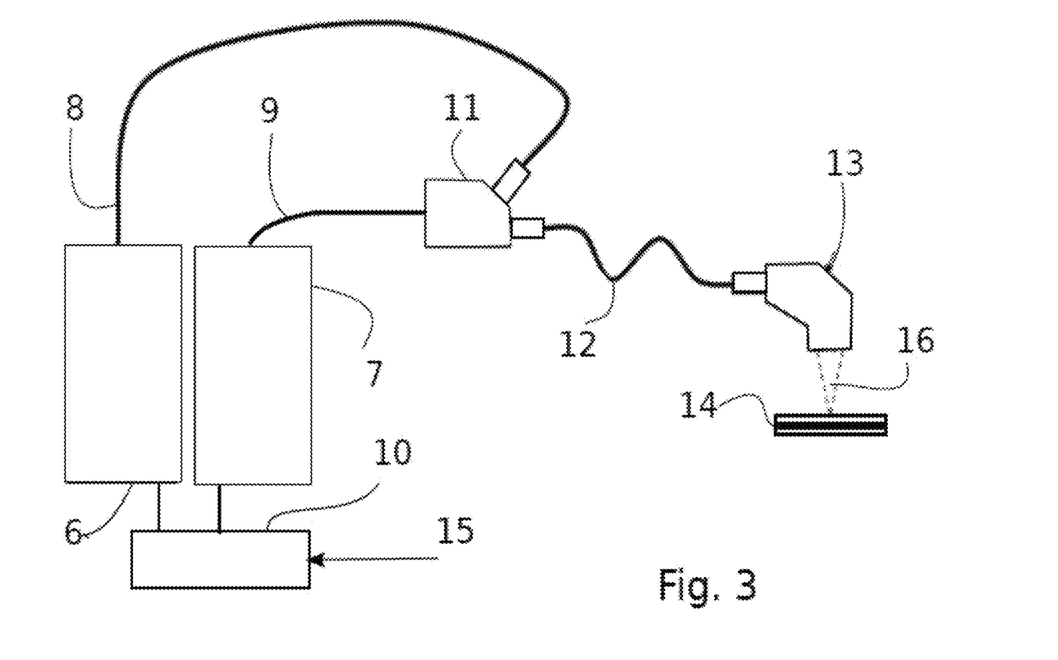
FIG. 3 shows a laser processing apparatus according to an embodiment of the invention.

FIG. 3 shows one embodiment of an inventive apparatus. A high brightness fiber laser 6 is connected with an optical fiber 8 to a laser beam combiner 11. Likewise, one or several solid state or diode lasers 7 are connected with a fiber 9 to the beam combiner 11. Generally, single laser beam combiners are known in the art. In this case the task of the combiner is to arrange all incoming laser beams so that they can be coupled to a dual core optical fiber 12. Thus, the hybrid nature of the laser is the result of having two laser beams propagating inside a single dual-core optical fiber 12. The two laser beams inside the fiber 12 have typically different brightness and intensity profiles, and may even have different wavelengths. Furthermore, the power levels in the two laser beams may be independently and continuously controlled by adjusting the power levels from the fiber laser 6 and solid state or diode laser 7.

In order to achieve a sufficient brightness of the beam, the high-brightness fiber laser 6 may consist of diode-pumped single or multiple fiber laser oscillator or master oscillator-power amplifier (MOPA) modules, each consisting of fiber-coupled diode lasers coupled to a fiber resonator, for example. Further examples of high-brightness lasers are fiber-coupled thin-disc lasers or Nd-YAG lasers, which are pumped with light from diode lasers. Modern laser technology frequently relies on light as energy transfer medium, as many active solid-state light amplification materials are insulators. Diode lasers have replaced previously used flash lamps because of their higher efficiency and narrower light spectrum.

The laser 7 is typically a fiber-coupled laser that may also comprise a solid-state laser resonator pumped by diode lasers, e.g. a thin-disc laser resonator (not shown). The dual core optical fiber 12 carries the laser beam from the fiber laser 6 in its center core and the beam generated by one or multiple second laser resonators 7 in an outer core which is arranged annularly around the center core, at a distance from the center core, see FIG. 5. Obviously, and in one embodiment of the invention, both first and second lasers may be fiber lasers, each having independently controllable power levels. Some lasers are fiber lasers by construction and inherently feed the light into an optical fiber, others need to be optically interfaced with a fiber in order to align the laser beam to the core of the output fiber. Thus, in some embodiments, both lasers 6 and 7 may be fiber lasers, in other embodiments any combination of fiber and solid-state or diode lasers, or both may be diode lasers. The purpose of the laser apparatus and the power ratings of the individual laser modules determine which kinds of lasers are feasible to be connected to the beam combiner 11.

The dual core optical fiber is at its opposite end connected to a laser processing head 13 which guides a combined or composite laser beam 16 onwards to a workpiece 14. The laser processing head 13 usually comprises collimating and focusing lenses (not shown) to produce an image of the intensity profile emerging from the end of the fiber 12 onto the workpiece 14 with a desired size, as determined by the focal lengths of the lenses. The task of the laser head 13 may also be to provide shielding gas to a weld seam, or pressurized gas jet to a cutting line. Pressurized gas also protects the optics within the laser head 13 from spitting molten metal, and also removes it from the cutting line helping to keep it clean.

In one embodiment of the invention, the apparatus is provided with a control unit 10. The control unit may also be integrated in one of the laser units 6 or 7. Alternatively, all units 6, 7 and 10 may be placed in a single housing and be integrated with each other in their construction, for convenience and reliability. The control unit may be used to perform power control of the ring and central beams profile, and to enable dynamically adjustable ring-center beam which can be adjusted on-the-fly as the application requires. The control unit may be configured to control modulation of at least one of the laser units 6, 7. Preferably the modulation of the both laser beams can be dynamically controlled separately. Hence, a large variety of different welding application and purposes becomes possible by the same apparatus. The beam profile may be dynamically adjusted to fit variety of demands of challenging welding types/applications, such as different materials, coatings and/or thicknesses.

The control unit 10 may receive feedback 15 from the user of the laser head 13, or automatic feedback e.g. from light intensity sensors. The feedback or input is then used to control the power of the lasers 6 and 7 to follow predetermined targets, or to adjust the laser power according to the resulting welding or cutting result observed at the workpiece 14. In an embodiment, when continuous welding is selected, the control unit may set appropriate parameters for welding by the ring beam 5 and close the center beam 4 or set it at a low level. The control unit 10, or another control unit may also control other functions of the welding apparatus, such as the movement of the laser processing head 13.

The control unit 10 may comprise a general-purpose computer, for example. Such a computer may be provided with appropriate software for controlling the lasers 6 and 7 based on given input parameters and received feedback 15. Alternatively, the control unit may comprise a microcontroller, such as a Renesas RL78 or Toshiba TLCS-870 microcontroller, or similar. The control unit may comprise, or be connected to, at least one memory. The memory may include various parameters affecting the operation of the apparatus, such as parameter sets defining different center and/or ring beam profiles and thus different welding profiles adjustable by an operator. The memory may store computer program code, the at least one memory and the computer program code being configured to, with at least one processing core to control the welding apparatus operations and central and ring beam generation according to various embodiments.

According to present invention, the beam combiner 11 is made of fused silica components where optical power is propagating inside fused silica through the entire combiner structure, and the combiner has optical fibers at the input and output. Therefore, in the present invention the beam combiner 11 can be called an all-glass fiber combiner.

Figure 4:
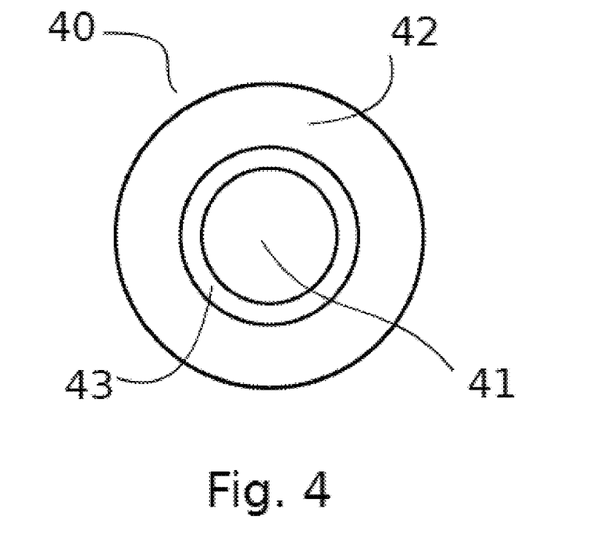
FIG. 4 shows in cross-section a composite laser beam according to an embodiment of the present invention.

In FIG. 4 is shown the structure of a composite laser beam 40 emerging from the laser processing head to the workpiece 14. An annular outer ring beam 42 is carrying the laser power provided by laser device 7.

Correspondingly, an inner central beam 41 is carrying the laser power provided by fiber laser device 6, and will cause a keyhole pattern in the workpiece, due to its higher brightness. Between the beams is an annularly shaped zone 43, which provides only stray or no laser radiation at all.

Figure 5:
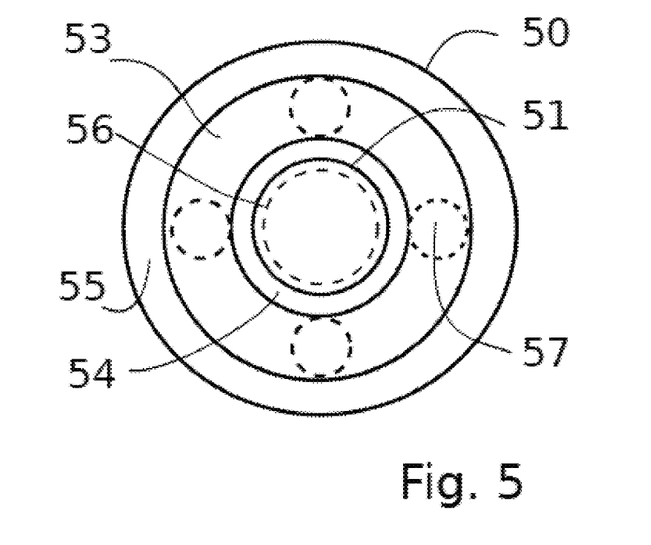
FIG. 5 shows a cross-section of a receiving end of coupling means according to an embodiment of the present invention.

In FIG. 5 is shown a cross-section of an example dual core optical fiber 50, having a central core 51 with a primary cladding 54. The outer core 53 is spatially formed by the inner cladding 54 and the outer cladding 55. As is clear to anyone familiar with the art, the cladding is defined as a material having a lower refractive index than that of the core. For example, the diameter of the central core 51 may be 70 µm, and the inner and outer diameters of the outer core 53 may be 100 µm and 180 µm, respectively. The central and peripheral cores 51 and 53 may also take other forms than those described above. The central core 51 may be of a square or rectangular shape, for instance. The peripheral core 53 may also have rectangular boundaries or be composed of multiple segments of linear or circular shapes.

With dashed lines is shown how the cores of the ends of fused feed fibers 56 and 57 (fibers 72 and 71 in FIG. 7) from the beam combiner may align with the cross-section of the dual core optical fiber 50.

The laser radiation in the central core 51 of the dual core optical fiber 50 has a central and narrow spatial intensity profile, while the intensity distribution in the outer core 53 is taking the shape of a doughnut. This spatial intensity pattern is further imaged with processing optics in the laser head 13 onto the workpiece. With this configuration, the beam quality of the laser beam is relatively high both in the center and outer cores. However, due to differences in shapes and cross-section areas, the inner core can produce a better beam quality than the outer core and is therefore better aimed at cutting thin materials and workpieces, or making piercing in cutting of thick materials. For thicker materials, the disadvantages of a somewhat lower beam quality produced by the outer core are outweighed by the combined processing speed and cleanliness of the weld seam or cutting surfaces due to the ring-like intensity distribution of the outer core. The power intensities of the inner and outer cores may be adjustable individually and according to the requirements of the workpiece, by adjusting the power of the originating laser sources.

Figure 6:
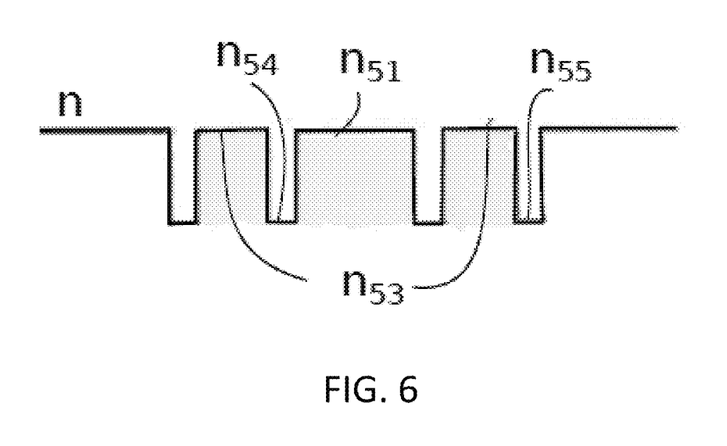
FIG. 6 illustrates the refractive index profile at the output of a coupling according to an embodiment.

Referring now to FIG. 6, an exemplary refractive index profile of an optical dual core fiber 50 is shown. The cores 51 and 53 have a refractive index $n_{51}$ and $n_{53}$ that is higher than the indexes $n_{54}$ and $n_{55}$ of the encircling materials 54 and 55 respectively. In this way the laser beam is guided to a workpiece with the least possible degradation in the annular intensity profile and attenuation of the optical power and intensity in each of the cores, cf. FIG. 4.

The refractive index of fused silica can be adjusted by doping it with impurities. Doping fused silica with Germanium results in an increase of the refractive index, while doping it with Fluorine results in reduction of the refractive index. Therefore the cores 51 and 53 may be made of Ge-doped or un-doped fused silica, and their primary claddings 54 and 55 of F-doped fused silica, for example.

Figure 7:
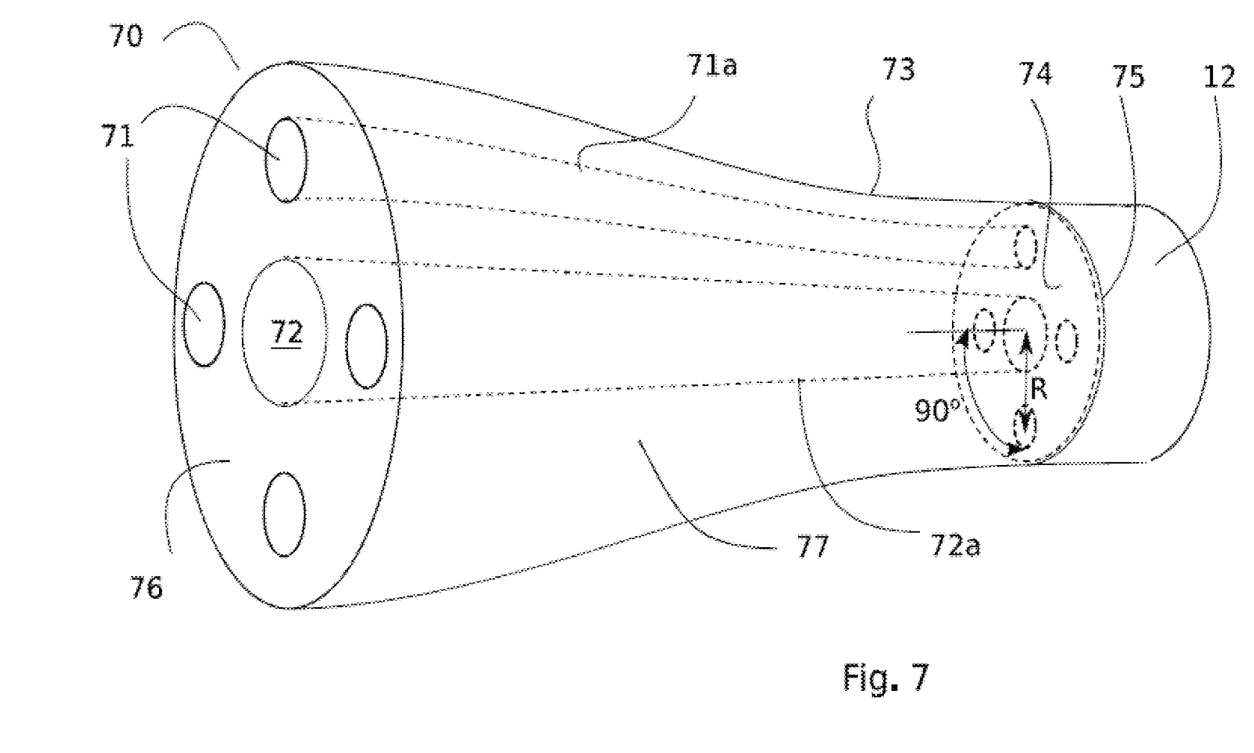
FIG. 7 shows schematically an optical component according to an embodiment.

In FIG. 7 is shown the key optical component 70 of the fiber combiner 11. It is a multi-bore capillary tube having a body portion consisting of a fused silica glass tube 77, an input end 76 for receiving laser beams (not shown) carried by optical feed fibers 71 and 72 from at least two laser devices (e.g. fibers 8 and 9 from devices 6 and 7). It also has an opposite output end 74 for delivering a composite output laser beam consisting of at least two laser beams aligned with each other in the same direction.

The optical feed fibers 71, 72 entering at the input end 76 extend through said body portion in capillary bores to said output end 74, and are fused with the glass tube 77 to form a component consisting of light guiding cores 71*a*, 72*a* and encircling glass material. The cores have refractive index that is higher than the refractive index of the encircling glass material around the cores to provide for propagation of optical power in the cores through the entire component by means of total internal reflection.

To show the principle of the fiber combiner, the dimensions of the cores and the dimensions of the component 70 are not in scale, and for clarity, only a couple of the cores are shown with dashed lines.

An optical component 70 may be manufactured by e.g. drawing. In this example, there may be a larger bore for the fiber 72 of about 300 µm in diameter in the center and four smaller bores for fibers 71 placed symmetrical and peripheral to the center bore 72. The smaller bores may have a diameter of about 150 µm, for example. The outside diameter of the capillary tube may be 1 mm. The material of the tube may be fused silica, for instance. The fibers, whose outer cladding of bulk glass (not shown) has preferably been etched away at least partly, are inserted into the middle bores and pushed through to a waist part 73 of the capillary taper. When the fibers are in place, the capillary tube 70 is heated at the waist section 73 to fuse the fibers to the tube and to form a first central light guiding core 72*a* and second light guiding cores 71*a*, which all extend through the optical component 70.

The fibers 71, 72 may as an alternative have an inner core of pure fused silica material and an outer cladding of F-doped silica. In this way, the fused silica glass tube 77 of the optical component 70 may be manufactured from pure fused silica, because the light-guiding cores of the fibers are inherently surrounded by material with a lower refraction index. This means that the light remains in the cores 71*a*, 72*a* even if the refraction index of the capillary tube is the same as in the fiber cores. In this case, the outer fiber cladding of bulk glass may be etched away down to the F-doped cladding, or even further, as long as some F-doped cladding remains around the pure or Ge-doped inner fiber core.

The fused cores 71*a*, 72*a* (shown with dashed lines) and tube 70 is then cut off or cleaved to create an end surface 74. A dual core fiber 12 like the one shown in FIG. 3 may then be welded to the capillary tube at the end 74, resulting in a seam 75.

In preferred embodiments, the center of the first optical feed fiber 72 is aligned with the center of the component 70, and the centers of, for example, four second optical feed fibers 71 are located to provide an output beam at the output end 74 at a predefined distance R from the first central light guiding core 72*a*. It is to be appreciated that the number of second feed fibers is not as such limited, but instead 8, 16 or 32 instead of 4, for example. The second light guiding cores 71*a* are preferably arranged symmetrically with respect to the central core 72*a*, to provide output beams with an angular distance of 90° between each other.

Above-illustrated embodiments for welding overlapping elements by ring and center laser beams have been tested with good results. For example, by using 4 kW for annular beam and 1 kW for the center beam has shown to provide welding with no gap between the elements and substantially without coating spatter with speed even over 5 meters per minute. The width of the elements may vary and the parameters adapted accordingly. For example, coated steel plates of widths from 0.1 mm to 10 mm may be welded by the presently disclosed method and apparatus, however, depending on the laser type and properties thereof. Other materials which may be processed and welded by the present solution include aluminum, copper. Also overlapping dissimilar materials may be welded together. For example, welding of steel and copper has been tested with good results. As another example, only one of the elements may be coated and the other not. Filler wire may be melt with the ring beam.

The presently disclosed laser welding method and apparatus may be applied in a large variety of applications. Particular advantages are achieved in applications where there is need to perform different welding of different characteristics during an assembly process, such as weld different materials, where the welding may now be performed by a single welding apparatus by changing the applied parameters. As one example, in automobile industry the same welding apparatus may be used to weld aluminum and stainless steel frames by a single welding apparatus (and line).

It is to be understood that the embodiments of the invention disclosed are not limited to the particular structures, process steps or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for welding a workpiece with a laser beam, said workpiece having overlapping, coated elements, comprising:
    generating at least one first laser beam in at least one first laser device and delivering the at least one first laser beam through at least one first optical feed fiber;
    generating at least one second laser beam in at least one second laser device and delivering the at least one second laser beam through at least one second optical feed fiber;
    combining said first and second laser beams in a multi-core optical fiber, the multi-core optical fiber having a first core with a circular cross-section located in the center of the multi-core optical fiber and a second core with an annular cross-section spaced from and concentric to the first core, wherein said at least one first optical feed fiber is aligned with and connected to the first core of said multi-core optical fiber wherein the at least one second optical feed fiber is aligned with and connected to the second core of said multi-core optical fiber, between the inner and outer diameters thereof;
    simultaneously directing a composite laser beam comprising a first output laser beam and an independent second output laser beam from said multi-core optical fiber to the workpiece to be welded, wherein the first output laser beam has a circular cross-section and the second output laser beam has an annular cross-section concentric to and spaced from the first output laser beam at the workpiece to define an intermediate annularly shaped zone which provides only stray or no laser radiation; and
    translating the composite laser beam along a path with respect to the workpiece whereby the overlapping elements are welded with the second output laser beam and an opening is created in one of the overlapping elements with the first output laser beam in order to release pressure caused by vaporization of the coating, said welding with the second output laser beam and the creation of the opening with the first output laser beam occurring simultaneously along the path and in a single pass along the workpiece and wherein a leading edge of the second output laser beam along the path of translation of the composite laser beam causes a first intensity peak in the workpiece and a rear edge of the second output laser beam along the path of translation of the composite laser beam causes a second intensity peak in the workpiece.

2. The method according to claim 1, wherein the power density in said first and second output laser beams is controlled individually by means of a control unit which is functionally connected to said first and/or second laser devices.

3. The method according to claim 1, wherein the workpiece comprises a first plate and a second plate, the composite laser beam is directed to the first plate, whereby the first output laser beam from said first core causes an opening through the first plate to the second plate and the second output laser beam from said second core substantially causes welding of the plates.

4. The method according to claim 3, wherein the plates are coated steel plates and the first output laser beam causes an opening for releasing pressure caused by vaporizing coating of the second plate.

5. The method according to claim 1, further comprising:
aligning the center of said first feed fiber with the center of said first core which is central in the cross-section of said multi-core optical fiber; and
aligning the center of a second feed fiber between the inner and outer diameters of an annular second core concentric to said first core.

6. The method according to claim 1, wherein said at least one first laser device is a fiber laser.

* * * * *